United States Patent Office 3,790,549
Patented Feb. 5, 1974

3,790,549
TERMINALLY REACTIVE POLYMERS
George Feniak, Wyoming, Ontario, Canada, assignor to Polymer Corporation Limited, Sarnia, Ontario, Canada
No Drawing. Filed Sept. 10, 1971, Ser. No. 179,536
Claims priority, application Canada, Sept. 25, 1970, 94,062
Int. Cl. C08d 11/00; C08f 3/14, 3/16
U.S. Cl. 260—94.8
4 Claims

ABSTRACT OF THE DISCLOSURE

Terminally reactive polymers are produced by ozonizing high molecular weight polymers of branched conjugated diolefins such as isoprene and reacting the ozonized products with modifying compounds such as hydrazine, hydroxylamine and dihydrazino compounds.

The reactive polymers are low molecular weight materials having terminal hydrazone, oxime and hydrazide groups; they react with polyfunctional compounds such as diisocyanates or epoxy resins to form cross-linked structures.

---

This invention relates to reactive polymers. In particular, it relates to a process of producing low molecular weight polymers having reactive terminal groups.

Terminal reactive liquid polymers are known. They have been prepared in the past by the ozonization of an isoolefin-butadiene copolymer followed by ozonolysis and oxidation of the ozonide as described in U.S. Pat. 3,392,154 (Baldwin). This prior art process is restricted to polymers of diolefins having no groups other than hydrogen atoms attached to the internal carbon atoms of the conjugated double bond system and cannot be used on polymers of e.g. isoprene.

It is an object of this invention to provide a process of preparing terminally reactive short chain polymers from long chain polymers of branched acyclic conjugated diolefins. A further object is to provide liquid polymers having terminal reactive groups and being capable of reacting with a polyfunctional agent to form a solid cross-linked structure.

The invention provides a process of producing a terminally reactive polymer capable of reacting with a polyfunctional agent to form a cross-linked structure, said process comprising the steps of:

(a) ozonizing a high molecular weight polymer containing at least 0.5 mole percent of monomeric units having the general structure

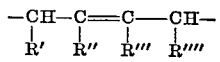

where R', R''' and R'''' are hydrogen or a $C_1$–$C_7$ hydrocarbon radical and R'' is a $C_1$–$C_8$ hydrocarbon radical whereby a low molecular weight polymer is produced having oxygenated terminal groups, at least one of said terminal groups being a keto carbonyl group, (b) reacting said lower molecular weight polymer with a modifying compound having a first group of atoms and a second group of atoms, said first group being capable of reacting with said keto carbonyl group so as to bond said second group to the polymer molecule, said second group having a labile hydrogen atom and being reactive with a functional group of said polyfunctional agent, and (c) recovering a low molecular weight polymer having terminal groups capable of reacting with functional groups of said polyfunctional agent.

The low molecular weight polymer produced in this process has an average of about two reactive terminal groups per molecule, at least one of said groups being oxime or hydrazone group. It readily vulcanizes with polyfunctional agents such as epoxide resin or polyisocyanates and forms solid cross-linked structures.

The process of the invention is performed on a high molecular weight, preferably solid polymer, containing monomer units having the general structure

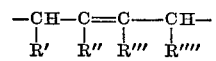

where R', R''' and R'''' are hydrogen or a $C_1$–$C_7$ hydrocarbon radical and R'' is a $C_1$–$C_8$ hydrocarbon radical. The above units are derived from branched acyclic $C_5$–$C_{12}$ conjugated diolefin monomers such as isoprene, 2-ethyl butadiene-1,3, 2-propyl butadiene-1,3, 2-phenyl butadiene-1,3, 2,3-dimethyl butadiene-1,3, 2-methyl pentadiene-1,3, 3-propyl hexadiene-1,3 by polymerization in the 1,4 configuration. Isoprene is the preferred monomer. The term "polymer" includes homopolymers of branched diolefins such as polyisoprene, poly-2,3-dimethylbutadiene and their copolymers with a polymerizable olefinically unsaturated hydrocarbon such as ethylene, propylene, butene, isobutene, pentene, hexene, styrene, allyl benzene, isopropenyl benzene. Cyclopentadiene, butadiene-1,3 and allene may also be present in the polymer, if desired.

At least 0.5 mole percent of the monomeric units derived from the branched acyclic conjugated diolefin should be present in the starting polymer. The amount may vary from 0.5 mole percent up to 100 mole percent. These units, being unsaturated, represent weak links in the polymeric chain when exposed to ozone. In the first step of this process described hereinbelow, they are split to form oxygenated groups at the ends of polymeric molecules having shorter chains than the starting polymer. Representative examples of such polymers are polyisoprene, poly-2,3-dimethylbutadiene, random and block copolymers of isoprene and styrene containing from about 25 to about 75% of styrene and butyl rubber. The butyl rubber is a copolymer of isobutylene and small amounts of isoprene and, if desired, other polymerizable monomers. Since it contains a small amount of unsaturation ranging from about 0.5 to 10 mole percent, the butyl rubber is preferably used when it is desired to produce an essentially saturated liquid polymer having terminally reactive groups which on reaction with a polyfunctional agent yields a rubbery vulcanizate having good weathering properties.

The starting polymer used in this invention is a high molecular weight preferably solid material having a viscosity average molecular weight of at least about 100,000. The molecular weight may vary within wide limits and preferably ranges from about 200,000 to about 1,000,000.

In the first step of the process of this invention, the high molecular weight polymer is ozonized by an ozone containing gaseous stream. The polymer is dissolved in an organic solvent, preferably a saturated aliphatic or cycloaliphatic hydrocarbon or halogenated hydrocarbon. Representative solvents suitable for use in this step are pentane, hexane, heptane, cyclohexane, carbon tetrachloride, tetrachloroethane and mixtures thereof. The solvent preferably contains a minor proportion of an agent having a labile hydrogen such as a lower alcohol e.g. methanol or lower carboxylic acid e.g. acetic acid. The agent is believed to facilitate splitting of the ozonized polymer into smaller fragments having oxygenated terminal groups. The step of splitting may be carried out simultaneously with or subsequently to the ozonization step. The concentration of the polymer in the solvent is selected so that the viscosity of the solution is suitable for dispersing of the ozone carrying gas in the solution. It may range from about 3% by weight to about 20%. The high concentration is used when the starting polymer has a low molecular weight, in the order of about 100,000, while lower concentration is preferred when the polymer is of high molecular weight and/or when the solvent used is a good solvent for the polymer.

The ozone containing gaseous stream, produced in a conventional ozone generator, is an oxygen containing stream with an ozone content of up to 15% ad preferably 1–10%. The stream is bubbled into the solution at a temperature range of about −20° C. to about 30° C. until a sufficient amount is added to react with a part or all of the carbon-to-carbon double bonds present in the polymer. The amount of ozone can be calculated from the unsaturation level present in the polymer and the degree of breakdown required in the final polymer considering that one molecule of ozone reacts with one double bond. In practice, an excess of ozone is required to achieve the desired breakdown.

The product prepared in the first step may be oxidized if desired. The oxidation is carried out in the presence of a peroxy acid such as peracetic acid or perbenzoic acid or with oxygen in the presence of an oxidation catalyst, usually a heavy metal salt such as manganese stearate or cobalt linoleate. When a peroxy acid is used, the temperature is maintained at about 0–70° C. Higher temperatures of up to 100° C. or preferably up to the boiling point of the solvent may be used when oxygen is employed as the oxidizing agent.

As mentioned hereinbefore, the high molecular weight starting polymer is split into smaller polymeric molecules. A majority of these short chain molecules are terminated with oxygenated groups, at least one of which is a keto group. The number of keto groups per molecule depends on the substituent $R'''$ present in the monomeric unit derived from branched conjugated diolefin. If it is a hydrocarbon radical, then the terminal groups are believed to be keto groups. If $R'''$ is a hydrogen atom, then the ozonized product will contain molecules having on the average about one terminal keto group, the other terminal group being an aldehyde or carboxy group. The keto carbonyl group is non-reactive. Consequently, the polymeric molecules having only keto groups are not affected by polyfunctional agents, while the polymers having at one end a keto group or an aldehyde group and at another end a carboxylic group are merely coupled in the presence of polyisocyanates. In other words, polymeric molecules having at least one carbonyl group attached to one of the termini cannot be cured with polyfunctional agents.

In accordance with this invention, terminally oxygenated polymers having, on the average, at least about one keto group per molecule such as are produced in the first step of the process are converted to polymers having reactive groups at both ends by reacting them with a modifying compound comprising a first group of atoms and a second group of atoms. The first group is a primary amine group capable of reacting with the carbonyl group and forming a double bond between the carbon atom of the carbonyl group and the nitrogen atom of the amine group. The second group of the modifying compound is a group having labile hydrogen atom capable of reacting with isocyanate compounds such as hydroxyl, primary amine or secondary amine. Representative examples of the modifying compound are:

| Hydrazine | $H_2N-NH_2$ |
| Ethyl hydrazine | $H_2N-NHC_2H_5$ |
| Phenyl hydrazine | $H_2N-NHC_6H_5$ |
| 4,4-dihydrazino-octafluoro-biphenyl. | 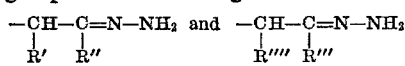 |
| Hydroxylamine | $H_2N-OH$ |

Hydrazine and dihydrazino compounds are preferred as they allow a wider selection of polyfunctional agents to be used in the vulcanization step. The unsubstituted hydrazine is the most preferred as it is readily available at a reasonable price.

Hydrazine treated polymer derived from the polymer having two terminal carbonyl groups is believed to have terminal groups of the following formula:

$$-CH-C=N-NH_2 \text{ and } -CH-C=N-NH_2$$
$$\phantom{-CH-}\overset{|}{R'}\phantom{C=}\overset{|}{R''} \phantom{\text{ and } -CH-}\overset{|}{R''''}\phantom{C=}\overset{|}{R'''}$$

where $R'$, $R''$, $R'''$ and $R''''$ are as defined hereinabove. Carboxylic agroup, if present in the ozonized polymer, reacts with hydrazine to form another reactive group, believed to be a hydrazide group

The reaction with hydrazine is preferably carried out by refluxing the solution of the oxygenated polymer in the presence of hydrazine. The term "hydrazine" as used in this and subsequent paragraphs is not a restrictive term; it illustrates and denotes in general all the modifying agents as described above. Hydrazine is added in an amount required to provide about one mole per mole of oxygenated groups present in the polymer including keto, aldehyde and carboxylic groups. Preferably, it is used in excess of the theoretical amount in order to prevent or depress coupling and chain extension that may take place in the presence of modifying compounds having two equally reactive groups added in insufficient amounts. The mixture of polymer and hydrazine is refluxed for about ½–5 hours at a temperature of 50° C. to 100° C. until substantially all keto and aldehyde groups are converted to hydrazones. If it is desired to convert also carboxyl groups to hydrazides, longer refluxing and/or higher temperatures of up to 150° C. are required, as this reaction is slower than the reaction with keto and aldehyde carbonyls.

The hydrazine modified polymer may be used as prepared, in the form of solution in an inert hydrocarbon or halohydrocarbon solvent but preferably it is isolated from the solvent using a conventional method of recovering low molecular weight polymers from solution. When isolated, the hydrazine modified polymer is a polymer which is pourable at a temperature above the second order transition point (glass transition temperature) and which has a number average molecular weight of the order of 1,000 to 50,000 and preferably 1,000 to 20,000. When the starting polymer has been a rubbery polymer, the hydrazine modified polymer of this invention is a viscous liquid at room temperature. The hydrazine treated polymer has an average of about two terminally reactive groups per molecule. This can be demonstrated by the substantial insolubility of a polymer sample cured with a polyfunctional agent. The difunctionality of the polymer can also be proved by determining the amount of amino, hydroxyl and carboxyl groups and the average molecular weight e.g. ebullioscopically and calculating therefrom the number of functional groups per molecule.

The polyfunctional agent that can be used for curing of the product of this invention is a compound containing two or more groups, reactive with the terminal groups of the polymer, such as epoxy groups, isocyanate groups, aziridinyl groups, allyl halide groups or carboxylic groups. Isocyanate compounds are preferred when the terminal groups are other than primary amines. Representative examples of isocyanate compounds are butane-1,4-diisocyanate, cyclohexane-1,4 diisocyanate, toluene diisocyanate, benzene-1,4 diisocyanate. Other organic di- and tri-isocyanates can also be used. The isocyanate compounds are used in amounts providing about one isocyanate group per terminally reactive group. If desired, the amounts may be increased or decreased substantially.

Epoxy compounds can advantageously be used to cure polymers terminated with primary amine groups derived from hydrazine and dihydrazino compounds. Representative examples of epoxy compounds are epoxy resins such as condensation products of epichlorohydrin and p,p'-isopropylidene diphenol, glycidyl ether derivatives of bis(4-hydroxyphenyl) methane, bis(4-hydroxyphenyl) dimethyl methane, tetrakis (4-hydroxyphenyl) ethane, glycerol, these derivatives having two or more glycidyl groups. The preferred epoxy resins are liquids having a Brookfield viscosity of from about 1 poise to about 1,000 poise measured at 25° C. and a molecular weight range of about 250 to about 2,000. The epoxy equivalent of these resins may vary from 100 to 300 expressed in grams of resin containing 1 gram equivalent of epoxide. The amount of epoxy resin used for curing of the hydrazine modified polymer is such that there is about one epoxy group per terminally reactive group in the modified polymer. In practice, the amount of the epoxy resin, however, may be varied from 1 epoxy group per terminally reactive group up to 10 epoxy groups depending on the properties required in the cured polymer.

The terminally reactive polymer of this invention may be compounded with various additives before curing. Such additives include carbon blacks, silicas, clays, colorants, antioxidants, plasticizers, and other materials known in the polymer compounding art. It may be also blended with other solid or liquid polymeric materials.

The compositions arising from this invention may be used in those applications in which low molecular weight polymers are employed. These applications include films, castings, laminates, sealants, potting compounds, rocket fuel binders and impregnants.

The following examples further illustrate the invention.

EXAMPLE I 80 grams of an isobutylene/isoprene copolymer having a Mooney viscosity (ML-8' @ 100° C.) of 45 and an unsaturation of 3.1 mole percent was dissolved in 1700 mls. of a mixed solvent of 85/15 heptane/acetic acid. Ozone from a conventional ozone generator was bubbled through the solution of the copolymer at the rate of 2.38 grams of ozone per hour for two hours at 10° C. The reaction mixture was then purged with a stream of nitrogen for 10 minutes, 7.8 grams of a 40% solution of peracetic acid in acetic acid were added and the temperature of the mixture was gradually raised to 50° C. over a period of 90 minutes, after which a further 15.6 grams of the 40% solution of peracetic acid were added. The solution was kept at 50° C. for 16 hours, then refluxed for 2 hours. Stirring was continued throughout the entire period of the reaction with peracetic acid. The mixture was cooled to room temperature, washed three times with water and then with a saturated aqueous solution of magnesium sulfate. The product was dried to yield an almost colorless liquid material having a viscosity of 280 poises at 30° C. Analysis of the product by titration with alcoholic sodium hydroxide indicated that the carboxyl content was about 94% of the theoretical and the ketone content determined by NMR was about 91% of the theoretical based on a theory that one —COOH and one keto group are formed from each double bond present in the starting material.

Seventy-three grams of the ozonized and oxidized product were dissolved in 200 mls. benzene, 10 mls. of anhydrous hydrazine added, and the mixture refluxed. After a period of four hours, a titration showed 39% of the original —COOH content remaining while after a period of 72 hours only 19% carboxylic group could be detected. Analysis by infra-red spectroscopy showed that the product contained hydrazone groups. The resultant product recovered from the solution was a straw-colored, syrupy liquid having a viscosity of 110 poises at 80° C.

Samples of the above hydrazone polymer were mixed with a liquid epoxy resin in amounts of 25 parts and 40 parts, respectively, of resin per 100 parts by weight of polymer. The resin was a condensation product of epichlorohydrin and bisphenol A having a viscosity at 25° C. in the range of 150–225 poises and an epoxide equivalent of 190–210. One set was cured without the use of a catalyst, while a second set was cured with the aid of 9 parts by weight per 100 parts by weight of epoxy resin of 2,4,6-tris(N,N-dimethylaminomethyl) phenol. The mixtures were pressure cured in a mold in the form of sheets for 1½ hours at 122° C. Stress-strain tests on the resultant vulcanizates using an Instron tester yielded the following results:

| Parts per 100 parts of polymer | | | | |
|---|---|---|---|---|
| Epoxy resin | 2,4,6-tris (N,N-dimethylaminomethyl) phenol | Modulus at 100% elongation (kg./cm.²) | Tensile strength at break (kg./cm.²) | Elongation at break (percent) |
| 25 | Nil | 33 | 62 | 180 |
| 40 | Nil | 12 | 32 | 270 |
| 25 | 9 | 11 | 18 | 290 |
| 40 | 9 | 39 | 47 | 120 |

Other portions of the hydrazone polymer were vulcanized with 25 parts of each of two other epoxy resins, one being an N,N,O-triglycidyl derivative of p-aminophenol, available as a viscous liquid under the trademark ERL 0500, and the other being a liquid condensation product of epichlorohydrin and bisphenol A having a viscosity at 25° C. within the range of 100–160 poise and an epoxide equivalent of 185–192, available under the trademark EPON 828. The mixtures were cured in the form of sheets for 1½ hours at 122° C. One half of these sheets was aged for 7 days at 120° C. in air, while the other half was stored at room temperature. Both the aged sheets and the unaged sheets were then tested for tensile strength and elongation. The results of these tests are given below.

| | Tensile (kg./cm.²) | | Elongation (percent) | |
|---|---|---|---|---|
| Epoxy resin | Before ageing | After ageing | Before ageing | After ageing |
| ERL 0500 | 44 | 41 | 60 | 80 |
| EPON 828 | 66 | 41 | 180 | 270 |

Specimens of the vulcanizate cured with the Epon 828 were weathered outdoors (rooftop exposure) for six months. Examination of these specimens indicated them to have superior ageing resistance to specimens of conventionally cured butyl rubber.

EXAMPLE II 20 grams of the ozonized and oxidized product of Example I was treated with 1.73 grams of 4,4'-dihydrazinooctafluorobiphenyl and refluxed for a period of 4 hours. The modified product, a viscous liquid, was mixed with a cycloaliphatic epoxy resin, available under the trademark ERL-4221, in a proportion of 25 parts of resin per 100 parts of polymer, and cured at 122° C. for 1½ hours. A weakly vulcanized rubber was obtained.

EXAMPLE III

The hydrazine treated product of Example I was cured with toluene diisocyanate (TDI) at 100° C. for 2 hours. Two levels of the TDI curative were used, 8 parts and 12 parts, respectively, per 100 parts of the liquid polymer. The cure was rapid; there was a marked increase in the viscosity of the compounds within 5 minutes of mixing and after 12 hours at room temperature, the compounds were tack-free.

The cured samples were tested for tensile strength and elongation and the results are as follows:

| TDI (parts/100 parts polymer) | Tensile strength (kg./cm.²) | Elongation (percent) |
|---|---|---|
| 8 | 8 | 240 |
| 12 | 18 | 180 |

EXAMPLE IV 40 grams of cis-1,4 polyisoprene dissolved in a mixture of 1400 mls. heptane and 25 mls. of glacial acetic acid were cooled to 10° C. and ozone was bubbled through it at the rate of 0.040 gram per minute for 75 minutes. 0.25 gram cobalt naphthenate was added. A gentle stream of air was then passed while the mixture was stirred and refluxed for a period of six hours. One gram of 2,2'-methylene-bis(4-methyl-6-tert. butyl phenol) antioxidant was added. The heptane solution was washed with water (4× 200 mls.) and concentrated. The product was a straw-colored liquid that was easily pourable at room temperature.

16.5 grams of the above product were dissolved in 50 mls. benzene and treated with 3.0 mls. anhydrous hydrazine. The resulting solution was refluxed for four hours and concentrated. The product was pale yellow in color and was readily pourable at room temperature. It cured extremely rapidly with toluene diisocyanate (TDI) even at room temperature. Curing was carried out for 30 minutes at 250° F. with 10 and 20 parts, respectively, of TDI per 100 parts of the viscous product and cured samples were tested for stress-strain properties. The results are presented below:

| TDI level (parts per 100 parts of polymer) | Tensile (kg./cm.²) | Elongation (percent) | 100% modulus (kg./cm.²) |
| --- | --- | --- | --- |
| 10 | 22 | 210 | 10 |
| 20 | 52 | 290 | 20 |

What is claimed is:

1. A curable hydrocarbon polymer having terminally reactive groups with a labile hydrogen atom, at least one of said groups being attached to polymer by

bond, and said polymer having a number average molecular weight of 1,000 to about 50,000 and being pourable at temperatures above the glass transition temperature.

2. The hydrocarbon polymer of claim 1 wherein at least one of the terminal groups is a hydrazone group having the general formula

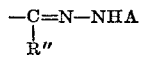

where R'' is a $C_1$–$C_8$ hydrocarbon radical and A is selected from the group consisting of hydrogen, a hydrazine substituted halohydrocarbon and a hydrocarbon radical.

3. The hydrocarbon polymer of claim 1 wherein the polymer chain is a substantially saturated chain of isobutene monomer units.

4. The hydrocarbon polymer of claim 1 wherein the polymer chain contains unsaturated monomer units derived from a branched acyclic $C_5$–$C_{12}$ conjugated diolefin monomer having a $C_1$–$C_8$ hydrocarbon radical attached to one of the internal carbon atoms of the conjugated double bond system.

References Cited

UNITED STATES PATENTS 2,556,876   6/1951   Hill _____ 260—94.9 R

OTHER REFERENCES

Encyclopedia of Polymer Sci. and Tech., vol. 2, pp. 775–6, Interscience, New York (1965), TP 156.P6E6.

Encyclopedia of Polymer Sci. and Tech., vol. 7, pp. 840–1, Interscience, New York (1967), TP 156.P6E6.

JOSEPH L. SCHOFER, Primary Examiner

A. HOLLER, Assistant Examiner

U.S. Cl. X.R.

260—80.78, 85.3 C, 85.3 R, 94.7 A, 94.7 D, 94.7 N